United States Patent
Woo

(10) Patent No.: US 7,382,115 B2
(45) Date of Patent: Jun. 3, 2008

(54) APPARATUS FOR CONVERTING DC POWER AND METHOD OF THE SAME

(75) Inventor: Jong Hyun Woo, Pyeongtak-si (KR)

(73) Assignee: LG Electronics Inc., Seoul (KR)

( * ) Notice: Subject to any disclaimer, the term of this patent is extended or adjusted under 35 U.S.C. 154(b) by 290 days.

(21) Appl. No.: 11/018,310

(22) Filed: Dec. 22, 2004

(65) Prior Publication Data

US 2005/0270002 A1    Dec. 8, 2005

(30) Foreign Application Priority Data

Jun. 7, 2004    (KR) ................ 10-2004-0041473

(51) Int. Cl.
G05F 1/40    (2006.01)

(52) U.S. Cl. .................. 323/282; 323/284; 323/340

(58) Field of Classification Search ............. 323/282, 323/283, 284, 285, 287, 222, 351, 340
See application file for complete search history.

(56) References Cited

U.S. PATENT DOCUMENTS

| | | | | |
|---|---|---|---|---|
| 2,897,352 A | * | 7/1959 | Smith-Vaniz, Jr. | 455/258 |
| 4,896,091 A | * | 1/1990 | Kislovski | 323/253 |
| 6,307,360 B1 | * | 10/2001 | Kajiwara et al. | 323/282 |
| 7,132,818 B2 | * | 11/2006 | Matsuura | 323/222 |
| 7,148,667 B2 | * | 12/2006 | Umemoto et al. | 323/282 |

FOREIGN PATENT DOCUMENTS

CN    1459682    12/2003

OTHER PUBLICATIONS

Chinese Office Action Dated Nov. 2, 2007 (With English translation).

* cited by examiner

Primary Examiner—Adolf Berhane
(74) Attorney, Agent, or Firm—Ked & Associates, LLP

(57) ABSTRACT

Embodiments according to the present invention can enhance an efficiency of an apparatus or method capable of converting power of a system. An apparatus for converting power includes a load state variation detector that detects a load characteristic state of the load unit; and an adjusting unit that adjusts a preset value of the circuit device of the load unit in accordance with the value detected by the load state variation detector. A method for controlling a power includes checking a load characteristic with respect to one or more than one element of system elements; and adjusting one or more than one circuit device value of a power block of the one or more than one element with respect to the load characteristic. In embodiments, it is possible to increase an efficiency of a DC/DC converter by varying a turn ratio of an inductor among the circuit devices of a converter and adjusting an inductance L.

28 Claims, 12 Drawing Sheets

Fig. 5
Related Art

| Input Parameter | Output Value | | |
|---|---|---|---|
| Vi, Vo, fs, BBM, | Duty | D | (Vo+Vdrop_L)/(Vi-Vdrop_H+Vdrop_L) |
| L,Q, Rdc_L, Rac_L | Top FET Drop | Vdrop_H | Io*Rds_HFET |
| Vgs, Rds, Qg, Coss, Crss | Bottom FET Drop | Vdrop_L | Io*Rds_LFET |
| Ci, Rciesr, Co, Rcoesr | Ripple current | ILrpl | (Vi-Vo)*D/(L*fs) |
| Eff_min, Rsense, Icc | Input current | Ii | Vo*Io/(Vi*Eff_min) |
| | | | (2πfL)/Q=Rdc_L |
| INDUCTOR LOSS | Lloss | | Io^2*Rdc_L + (ILrpl/2)^2*Rac_L |
| TOP FET LOSS | HFloss | Conduction Loss | HFloss_con | Vdrop_H*Io*D |
| | | Gate Charging Loss | HFloss_gate | QgH*Vgs*fs |
| | | Switching Loss | HFloss_sw | 1.7*Vi^2*fs*CrssH*Io |
| | | Coss Loss | HFloss_c | 1/2*CossH*(Vi+Vdrop_H)^2*fs |
| BOTTOM FET LOSS | LFloss | Conduction Loss | LFloss_con | Vdrop_L*Io*(1-D-BBM*fs) |
| | | Gate Charging Loss | LFloss_gate | QgL*Vgs*fs |
| | | Coss Loss | LFloss_c | 1/2*CossL*(Vi+Vdrop_L)^2*fs |
| SCHOTTKY DIODE LOSS | Dloss | Conduction Loss | Dloss_con | Vf*Io*BBM*fs |
| | | Switching Loss | Dloss_sw | Cj*Vi^2*fs |
| | | Reverse current Loss | Dloss_off | Vi*Ir*(1-BBM*fs) |
| INPUT CAPACITOR LOSS | Ciloss | | Rciesr*Ii^2 |
| OUTPUT CAPACITOR LOSS | Coloss | | Rcoesr*(ILrpl/4)^2 |
| CURRENT SENSE LOSS | Rloss | | Rsense*Io^2 |
| IC LOSS | ICloss | | Vi*Icc |
| TOTAL LOSS | Tloss | | Lloss+Hfloss+Lfloss+Dloss+Ciloss+Coloss+ Rloss+Icloss |
| EFFICIENCY CALCULATION | Eff | | Vo*Io/(Vo*Io +Tloss) |

APPARATUS FOR CONVERTING DC POWER AND METHOD OF THE SAME

BACKGROUND OF THE INVENTION

1. Field of the Invention

The present invention relates to an apparatus and method for converting a DC power.

2. Background of the Related Art

FIG. 1 is a block diagram illustrating a conventional computer system. As shown in FIG. 1, a bus or a data line connects a CPU (Central Processing Unit), a power supply 10, and a LCD (Liquid Crystal Display) of a display unit.

The power supply 10 includes an AC (Alternating Current) adaptor 20 that rectifies an alternating current voltage that is a power source, a battery 30 that is installed in the interior of the system and is used as an assistant power, and a DC/DC converter 40. The DC/DC converter is connected with the above loads and increases and decreases the DC voltage.

A portable device such as a notebook computer, etc. generally includes the DC/DC converter 40 capable of increasing and decreasing the power source for achieving a desired level of power from the AC adaptor 20 or the battery 30. Accordingly, the portable device system uses the power having a certain level.

FIG. 2 is a block diagram illustrating a system that includes a power block adapted in the conventional art that can be adapted according to the present invention. As shown in FIG. 2, there are provided an AC adaptor 20 capable of converting an input AC power into a DC power, and a battery 30 used as an assistant power.

Power is selectively switched by a load switch and is applied to each power block 60. The power is applied to each element (e.g., CPU, etc.) of the system through each power block.

FIG. 2 is a view illustrating a power block of a notebook computer system. Each power block shows different efficiency characteristics. FIG. 3 is a circuit diagram of a buck DC/DC converter 50 having 1.1 volts used by the CPU power with a large variation in a load characteristic in the power block.

As shown in FIG. 3, the buck DC/DC converter 50 includes an input capacitor Ci driven with an input power, voltage Vi or a current source, one or more than one FET 50b, 50c that performs a switching operation from a source input terminal to an output terminal. The DC/DC converter also has an IC 50a that controls the switching unit and an inductor (L) 50d that is adapted for a voltage source.

FIG. 4 is a circuit diagram of an inductor (L) 50d of FIG. 3 where an input terminal 1 and an output terminal 2 are fixed. In the circuit diagrams of FIGS. 3 and 4, the efficiency of the circuits could be computed based on the following equation 1.

$$Eff(\%) = \frac{P_{OUT}}{P_{IN}} \quad \text{[Equation 1]}$$
$$= \frac{P_{OUT}}{P_{OUT} + P_{LOSS}}$$
$$= \frac{V_{OUT}I_{OUT}}{V_{OUT}I_{OUT} + P_{LOSS}}$$

FIG. 5 is a diagram illustrating circuits or circuit components that affect a loss of the above circuit. As shown in FIG. 5, input parameters are formed of circuit devices such as voltage, inductor, FET, capacitance, IC, etc. The inductor can be determined to most affect the loss of the circuit. The inductor can cause over 40% in the total loss. The loss of the inductor may be expressed in the following equation 2.

$$Lloss = Io^2 * Rdc\_L + (ILrpl/2)^2 * Rac\_L \text{ (where } Rdc\_L: \text{ DCR of Inductor, } ILrpl: \text{ Inductor ripple current, } Rac\_L: ACR \text{ of Inductor)} \quad \text{[Equation 2]}$$

In the equation 2, the loss of the inductor is formed of a loss caused because of a winding resistance and a core loss.

The inductor has DC resistance loss, skin effect loss, hysteresis loss, eddy current loss, etc. In addition, the loss can be classified into a loss caused due to a DC resistance component and a loss caused due to an AC resistance component with respect to an output ripple current based on the cause of the loss.

$$\text{Inductor loss} = \text{copper loss} + \text{core loss} \quad \text{[Equation 3]}$$

In equation 3, the copper loss represents a loss caused due to a DC resistance component and a resistance component based on a skin effect. The core loss is formed of an eddy current loss and a hysteresis loss.

In the conventional (buck) DC/DC converter, the equation for selecting the inductor can be expressed as follows.

$$L = \frac{(V_i - V_S - V_O) * D * T_s}{I_{ripple}} \quad \text{[Equation 4]}$$

As shown by the equations 2 and 4, the inductance L of the inductor is in inverse proportion to ILrpl, and ILrpl is in square proportion to the loss of inductor.

Accordingly, it is possible to decrease the loss of the inductor by increasing the value L. When the value L is increased, the values Rdc_L and Rac_L are changed. Since the variation of the value Ilrpl is much larger, it is possible to improve the loss of the inductor.

FIG. 6 is a graph of a simulation formed by adapting the loss of each circuit device of FIG. 5 with respect to the conventional converter of FIG. 3. Namely, there is shown an efficiency curve in the entire load sections of the CPU, and DC/DC converter.

As shown in FIG. 6, in the overall or entire load sections, the efficiency of over 80% is achieved. However, the efficiency in FIG. 6 is largely decreased when the load current is low. The efficiency is low in the section 0-2 A (in particular 0-0.2 A) that is an actual load section during the use of the CPU.

Thus, the efficiency is not uniform in the entire load sections 0-13.5 A. It means that the loss is changed by the load section.

A certain or calculatable efficiency difference can be seen when the CPU load is high, and the CPU load is low, respectively. FIGS. 10 and 11 ate diagrams illustrating the degrees of the loss by each circuit device when the CPU load is high or low. FIG. 10 is a diagram illustrating that the loss is 58.4% due to the inductor when the CPU load is low (for example, 0.2 A). FIG. 11 is a diagram illustrating that the loss is 19.3% due to the inductor when the CPU load is high (for example, 13 A).

As shown in FIGS. 10-11, the ratio of the inductor is largest of multiple causes. As the load is getting more decreased, the ratio is getting increased. When the load is 0.2 A, the ratio is over 58.4%.

Therefore, it is possible to increase the efficiency as long as the loss caused due to the inductor is decreased. Thus, there is a long felt need to increase the efficiency of the DC/DC converter. However, it is known that it is impossible to achieve the loss of the inductor with the fixed value L.

The above references are incorporated by reference herein where appropriate for appropriate teachings of additional or alternative details, features and/or technical background.

SUMMARY OF THE INVENTION

An object of the invention is to solve at least the above problems and/or disadvantages or to provide at least the advantages described hereinafter.

Another object of the present invention to provide a structure of an inductor having a multi-tap structure so that an inductance can be adjusted by varying the turn ratio of an inductor in the construction of the circuit devices in order to enhance the efficiency of a DC/DC converter.

Another object of the present invention is to adjust a value L by the load characteristics in such a manner that a variation degree of a load characteristic (for example, current value of CPU) is detected using a detection circuit and is transferred to a L-value adjusting unit using a feedback circuit.

Another object of the present invention is to provide a method capable of increasing an efficiency of a converter by adjusting a value L in a first section, not adjusting a value L in a second section, when a load characteristic section is divided into the first and second sections.

Another object of the present invention is to provide an apparatus and method for converting a DC power that is capable of checking a load characteristic of a selected element of a system for thereby variably adjusting a preset circut device with respect to the checked load characteristic.

Another object of the present invention is to provide an apparatus and method for converting a DC power that is capable of checking a load characteristic of a certain element of a system for thereby variably adjusting a preset circut device value with respect to the checked load characteristic portion having a prescribed response.

Another object of the present invention is to provide an apparatus and method for converting DC power that increases an efficiency of a DC/DC converter by varying a turn ratio of an inductor in the circuit devices of a converter and adjusting an inductance L.

Another object of the present invention is to provide an apparatus and method for converting DC power that increases an efficiency of a converter by classifying a load characteristic section into a good efficiency section and a bad efficiency section and adjusting a value L in the bad efficiency section.

In order to achieve at least the above objects and advantages in a whole or in part, in accordance with one aspect of the present invention there is provided in a system that includes a load unit having a circuit device between an input terminal and an output terminal, an apparatus for converting power that includes a load state variation detector configured to detect a load characteristic state of the load unit and an adjusting unit configured to adjust a preset value of the circuit device of the load unit in accordance with the load characteristic state detected by the load state variation detector.

To further achieve at least the above objects in a whole or in part, in accordance with one aspect of the present invention there is provided a method for operating a power converter that includes coupling at least one system element among system elements to at least one power block, checking a load efficiency value with respect to the at least one system element, operating at least one circuit device element of the at least one power block in a first mode or a second mode, wherein the at least one circuit device element is operated in a first mode when the load efficiency value is above a first threshold value.

To further achieve at least the above objects in a whole or in part, in accordance with one aspect of the present invention there is provided a method that includes operating a system element based on at least one power block, checking a load characteristic with respect to at least one element in the system element, determining whether the load characteristic is below a preset value and adjusting at least one circuit device value of an element of the power block when the load characteristic is below the preset value.

To further achieve at least the above objects in a whole or in part, in accordance with one aspect of the present invention there is provided a method for controlling power that includes operating a power conversion system using at least one value among load values set in at least one circuit device and a first time constant corresponding thereto, checking one or more than one load characteristic of the power conversion system, changing at least one value among the load values in the at least one circuit device based on a changed load characteristic when the load characteristic is changed as a result of the check and controlling the power conversion system using the at least one changed load value.

To further achieve at least the above objects in a whole or in part, in accordance with one aspect of the present invention there is provided a method for controlling power that includes forming a system of a plurality of power blocks that each include one or more than one circuit device, checking one or more than one load characteristic in a first power block, judging whether a changed load characteristic is in a preset value range outside a current value range when the load characteristic of the first power block changes, adjusting one or more than one circuit device value of the first power block when the changed load characteristic corresponds to the preset change value as a result of the judgment and operating the system using the adjusted value.

To further achieve at least the above objects in a whole or in part, in accordance with one aspect of the present invention there is provided an apparatus for converting power that includes a load unit having a circuit device between an input terminal and an output terminal that includes an adjusting unit configured to receive a variation level of a load characteristic of the load unit and adjust a preset value of the circuit device of the load unit among at least two levels.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 5 is a diagram illustrating circuit devices that affect a loss of a circuit block;

DETAILED DESCRIPTION OF PREFERRED EMBODIMENTS

In a mobile instrument that uses battery, an efficiency of a power conversion apparatus is determined depending on an actual use time of a mobile instrument. A compactness and lightness of the power conversion apparatus are important, but the extension of use time of battery is important as well.

According to embodiments of the invention, to enhance the efficiency of a DC/DC converter, a load characteristic (e.g., CPU current) of at least one certain element/elements among load elements can be checked. When the load characteristic (e.g., CPU current) drops below a certain level (e.g., 0.2 A) or in a certain section, it can be determined that the efficiency of the converter is decreased (e.g., significantly). To reduce or overcome the above problems, embodiments of apparatus and method according to the invention can variably adjust a performance (e.g., the inductance (for example, TURN ratio)) of a certain circuit device value (for example, inductor) that has a relatively high effect with respect to the efficiency of the converter so that the efficiency can be varied. However, the present invention is not intended to be so limited as other circuit devices or methods could be used to adjust the efficiency.

One or more than one power block (e.g., DC/DC converter) can be provided for supplying power or signal to a certain element of the system. The difference of the efficiency of the power block can be significantly changed based on a load characteristic section (e.g., output current or input current) of a certain element such as CPU, etc. Therefore, it is possible to improve power efficiency overall and/or with respect to a certain section of the loads in such a manner that one or more circuit device values (e.g., inductor) that affects the characteristic of loads are variably adapted.

Figure 7:
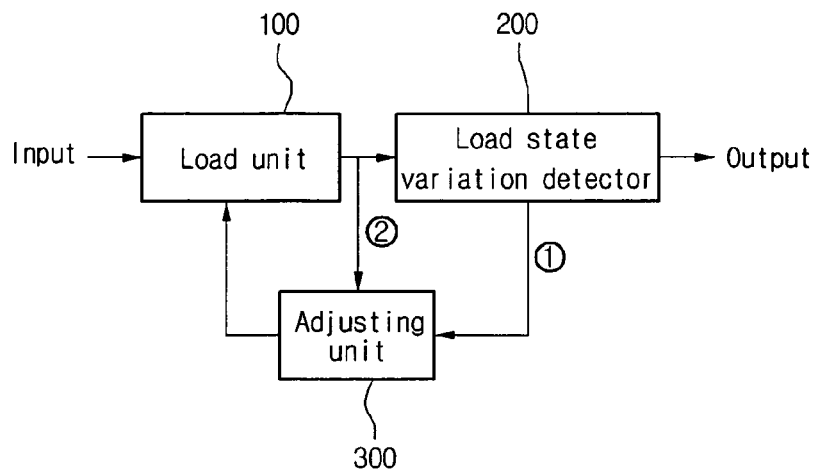
FIG. 7 is a block diagram illustrating an embodiment of a DC/DC converter for changing an efficiency of the converter according to the present invention.

FIG. 7 is a block diagram illustrating an embodiment of a DC/DC converter and a construction for changing an efficiency of the converter according to the present invention. As shown in FIG. 7, a system can include a load unit 100 having a circuit device between an input terminal and an output terminal, a load state variation detector 200 that detects a load characteristic state (e.g., CPU current value or output current value) of the load unit and an adjusting unit 300. The adjusting unit 300 can adjust a value of a circuit device (e.g., inductor) among the circuit devices of the load unit in accordance with a value detected by the load state variation detector 200.

As shown in FIG. 7, an output current of a controller that corresponds to a load characteristic state of the load unit 100 can be detected by the load state variation detector 200 in a form of one or more than one step. For example, the turn ratio of an inductor of the multi-tap structure can be varied by a switch unit (e.g., adjusting unit), corresponding to the step-based level, for thereby adjusting the inductance L. Therefore in the embodiment of FIG. 7, it is possible to enhance the efficiency of the converter in a certain characteristic section of the load characteristic value.

In FIG. 7, the circuit elements (e.g., turn ratio of the inductor of the multi-tap structure) can be varied (e.g., by a switch unit) in such a manner that the output current of the controller or load unit 100 in the load characteristic state of the load unit is directly inputted into the adjusting unit 300 for thereby adjusting the inductance L. In this exemplary manner, it is possible to enhance the efficiency of the converter in a certain section or a plurality of sections of the load characteristic value.

However, the present invention is not intended to be so limited. For example, the adjusting unit 300 could adjust a time constant of the load unit 100. The time constant could be changed independent of or corresponding to coordinated changes in circuit elements of the load unit 100.

Figure 3:
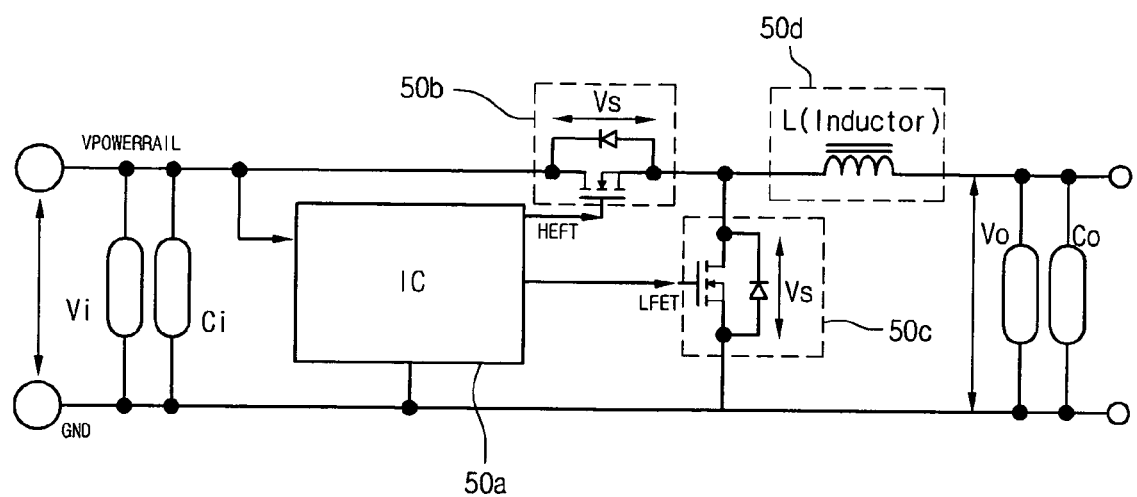
FIG. 3 is a circuit diagram of a buck DC/DC converter.
Figure 4:
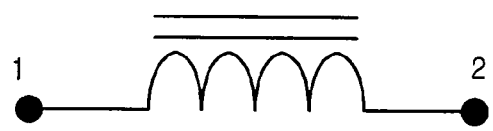
FIG. 4 is a circuit diagram of an inductor of FIG. 3.
Figure 6:
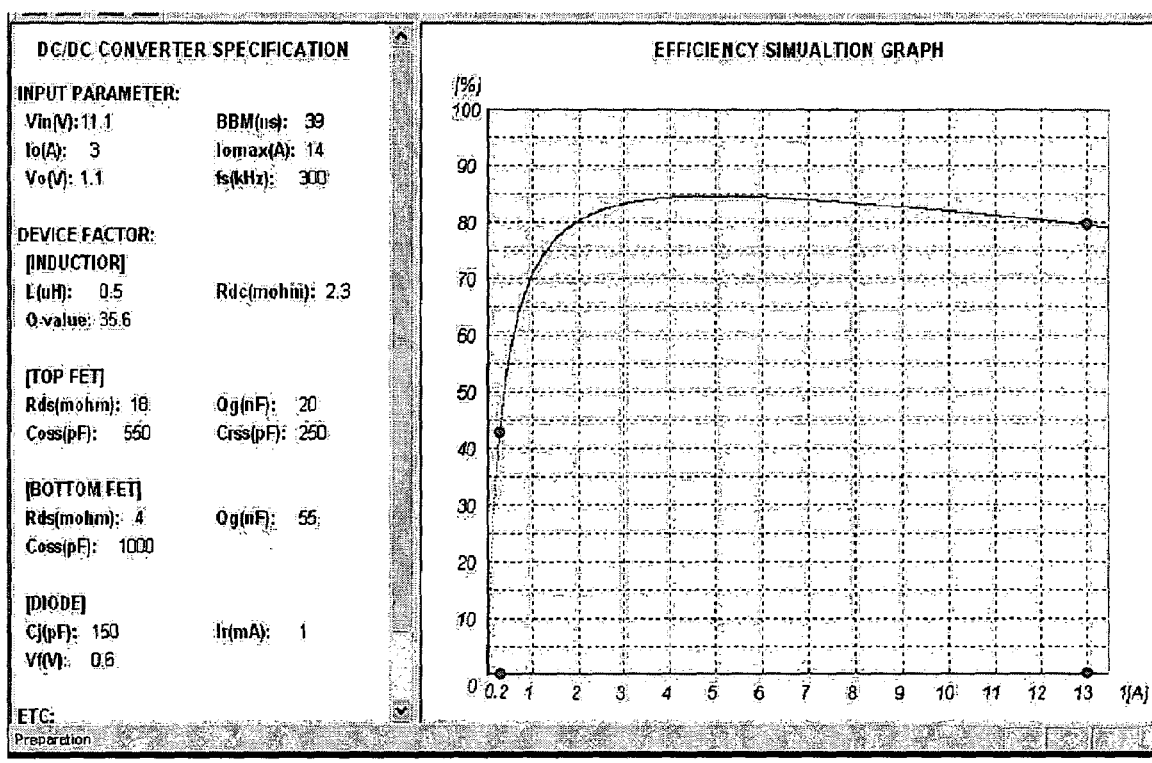
FIG. 6 is a graph of a simulation by adapting the loss of each circuit device with respect to the conventional converter of FIG. 3.
Figure 8:
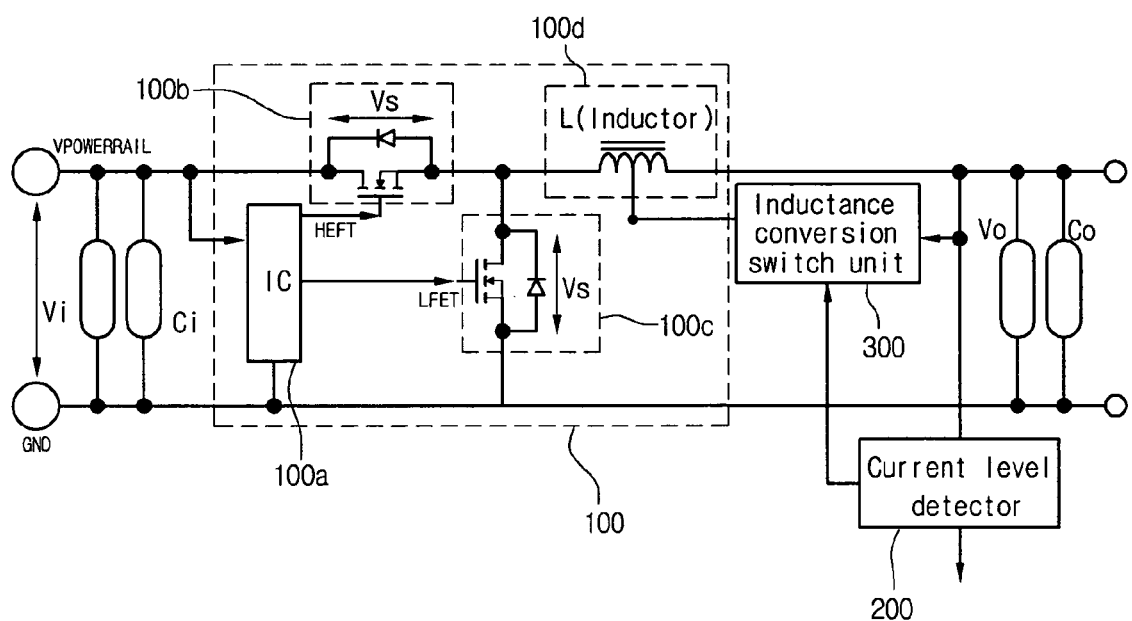
FIG. 8 is a circuit diagram of a DC/DC converter using a variable type inductor of a multi-tap type according to the present invention.

FIG. 8 is a circuit diagram of an embodiment of a DC/DC converter using a variable type inductor of a multi-tap type structure according to the invention. Differences between construction of the embodiment of FIG. 8 according to the invention and the conventional circuit construction of FIG. 3 will now be described.

As shown in FIG. 8, there is provided a multi-tap type inductor (for example, 3-tap structure) 100d. Further, a current level detector 200 can perform at least one operation among its operations in which a variation of a load state is detected. The detected load characteristic value can be set in a form of one or more step-based levels, and each step-based level can have a prescribed value.

In addition, an inductance switch unit 300 can vary the inductance of the inductor (L) in accordance with a value (e.g., from the current level detector 200). FIG. 8 illustrates an exemplary buck converter. However, embodiments of the present invention are not intended to be so limited and are applicable to converters such as boost converters or the like.

Further, as described above, the system of FIG. 7 has three exemplary elements. However, embodiments of the present invention are not intended to be so limited. For example, the functionality of the load state variation detector 200 can be combined with the adjusting unit 300, the adjusting unit 300 can be combined with the load unit 100, or other combinations. Further, changing the inductance of the load unit 100 can be described by changing a center tap of the inductor shown in FIG. 9. However, embodiments of the present invention are not intended to be so limited because an additional inductor can be switched in and out of the load unit 100.

Figure 9:
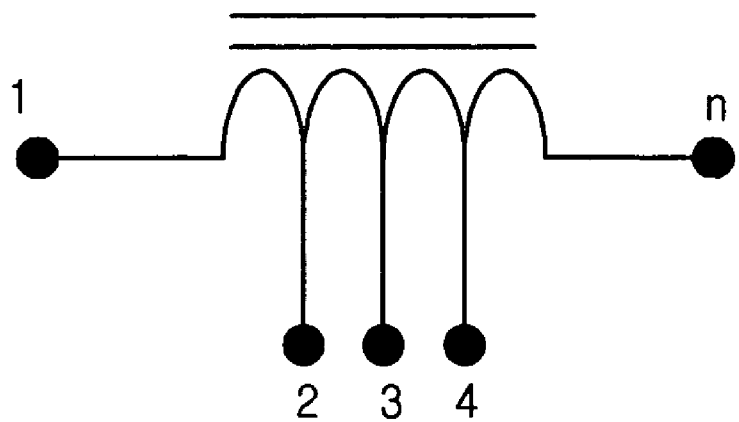
FIG. 9 is a circuit diagram illustrating an inductor 100d of FIG. 8.

FIG. 9 is a circuit diagram of an exemplary inductor 100*d* of FIG. 8. As shown in FIG. 9, a multi-tap type inductor has multi-taps (e.g., 3 or 4 taps) so that the inductance can be changed based on the characteristic of load.

Operations of embodiments of the invention will now be described with reference to FIGS. 8 and 9. Generally, the design section of the CPU core power covers a prescribed range (e.g., 0~13.5 A).

Figure 10:
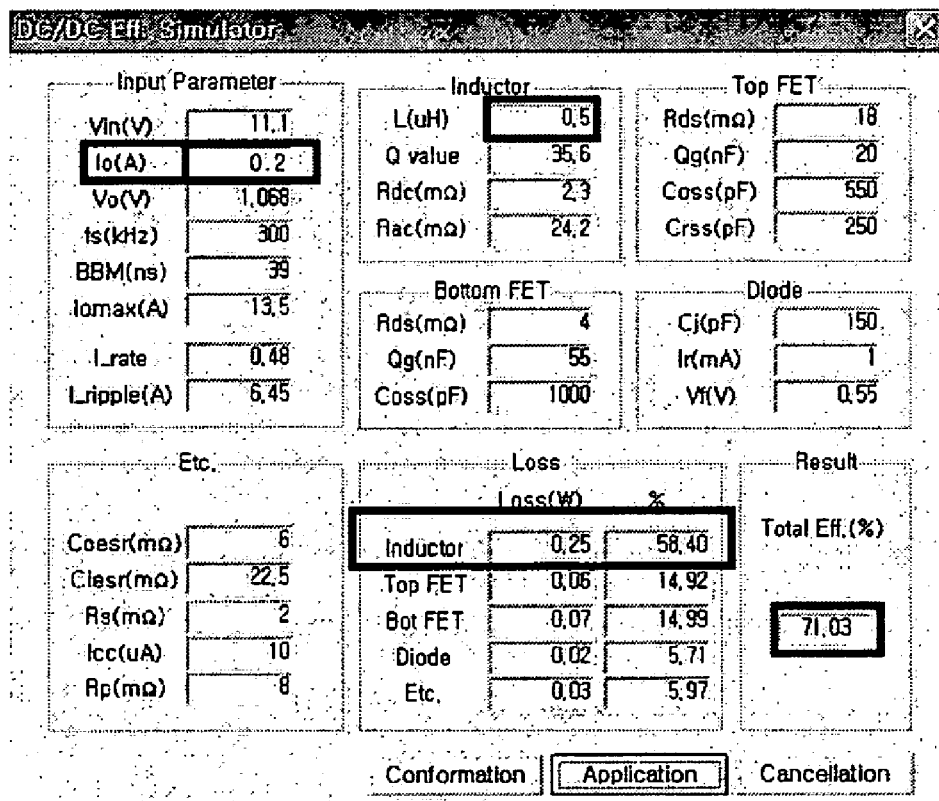
FIG. 10 is a diagram illustrating an operation that the loss by an inductor is 58.4% when the load of a CPU is low.
Figure 11:
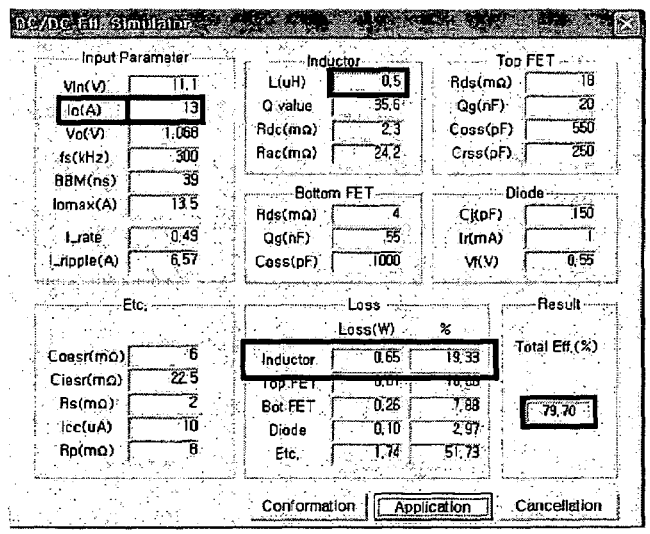
FIG. 11 is a diagram illustrating an operation that the loss by an inductor is 19.3% when the load of a CPU is high.
Figure 12:
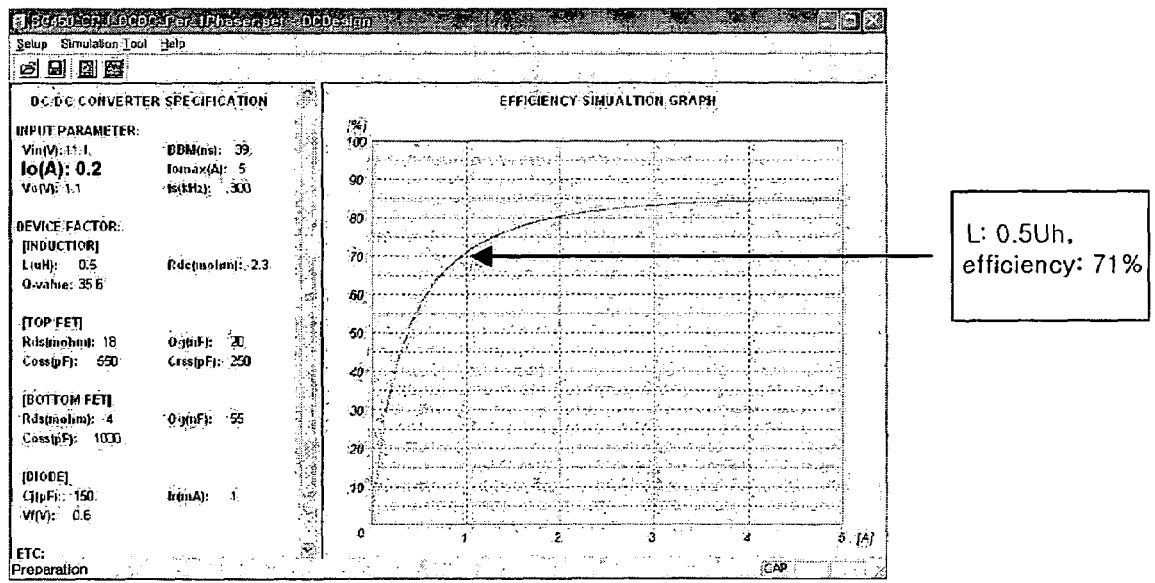
FIG. 12 is a diagram illustrating a state that the loss of an inductor 58.4% at 0.2 A, and the efficiency is 71% at 0.2 A.

Assuming that the current detection circuit is designed to detect the current at 0.2 A in each section of the entire design sections, the CPU load can maintain an operation that the first set inductance of the inductor is 0.5 uH in the variation section of 0.2 A through 13.5 A. The efficiency characteristic is shown in FIG. 10. The loss of the inductor is 58.4% at 0.2 A, and the efficiency of the load is 71% as shown in FIG. 12.

The load state (e.g., current) detection circuit 200 can operate to detect section transitions. Thus, the current detection circuit 200 can operate at the time when the use of the CPU is increased, and the current drops below 0.2 A. An output signal can be transmitted to the adjusting (e.g., variable inductance switch) unit 300, so that the inductance is varied based on a switching operation of the multiple-terminal (e.g., three terminals) inductor 100*d*.

Since the inductance can be determined in proportion to the number of windings, the inductance can be varied as the number of the windings of the inductor is changed. Therefore, the inductor of the three-terminal structure can be designed to have 0.5 uH, 2 uH, etc. can be varied (e.g., between 0.5 uH and 2 uH) during the switching operation.

Figure 13:
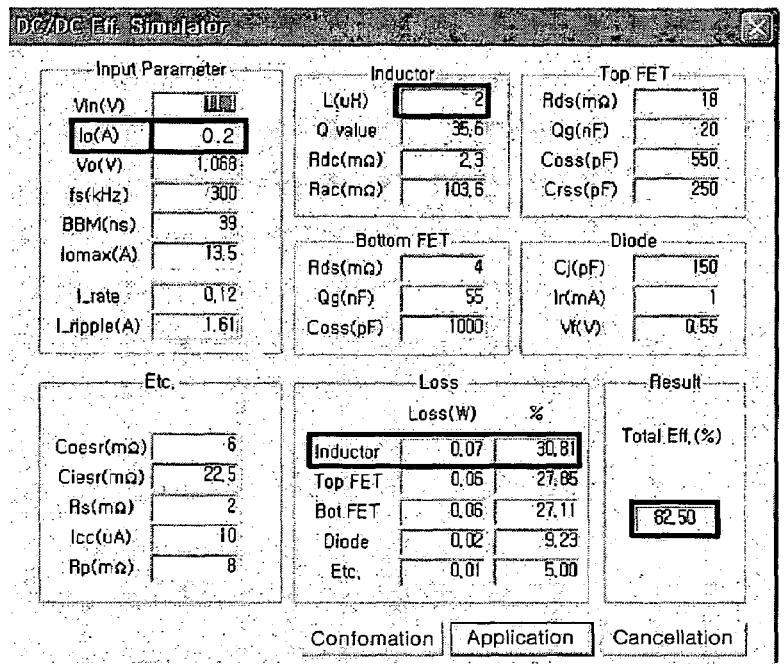
FIGS. 13 and 14 are diagrams illustrating an operation that efficiency is improved by varying inductance.
Figure 14:
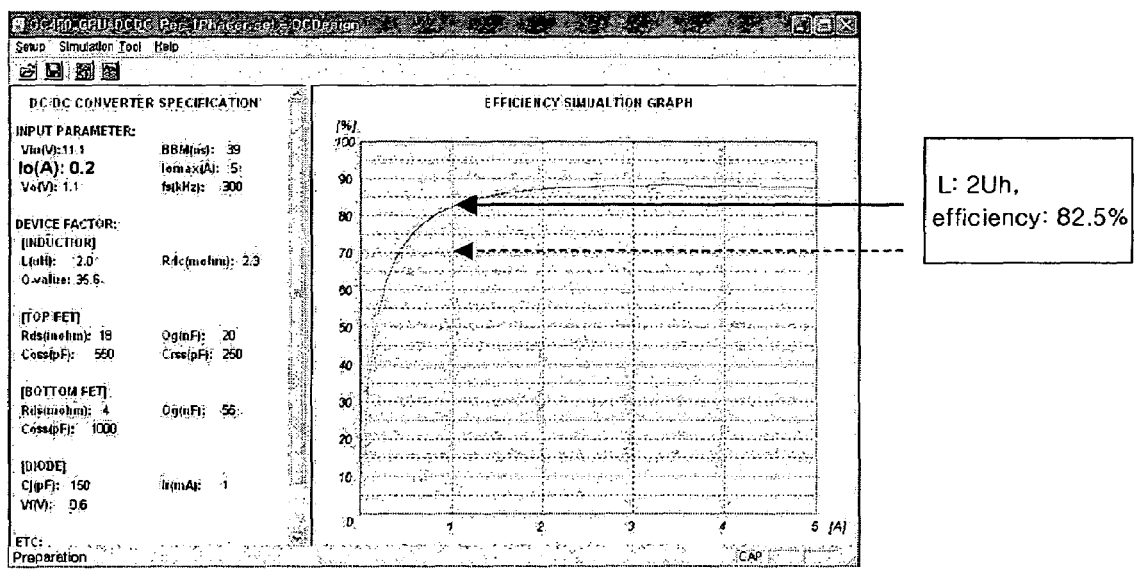

The efficiency and loss difference of the embodiment of FIGS. 8-9 can be determined and can be modified as shown in FIGS. 13 and 14, respectively. Therefore, it is known that a significant improvement is achieved as compared to a result before the inductance is varied.

For example, in the case of the load below 0.2 A, the loss of the inductor can be decreased from 58.4% to 30.8% by varying the inductance. Therefore, it is known that the entire efficiency is enhanced from 71% to 82.5%, which can decrease the loss as shown in FIGS. 10, 13 and 14.

However, the present invention is not intended to be so limited. For example, the load characteristic shown in FIG. 14 can be divided into 3 prescribed ranges or more than 3 steps/levels to provide additional granularity to embodiments of apparatus and methods according to the present invention. Thus, the range below 1 Amp could be divided into three or more ranges. Similarly, corresponding circuit elements can be varied to each range. For example, the exemplary inductor shown in FIG. 9 has 3 center taps.

Figure 1:
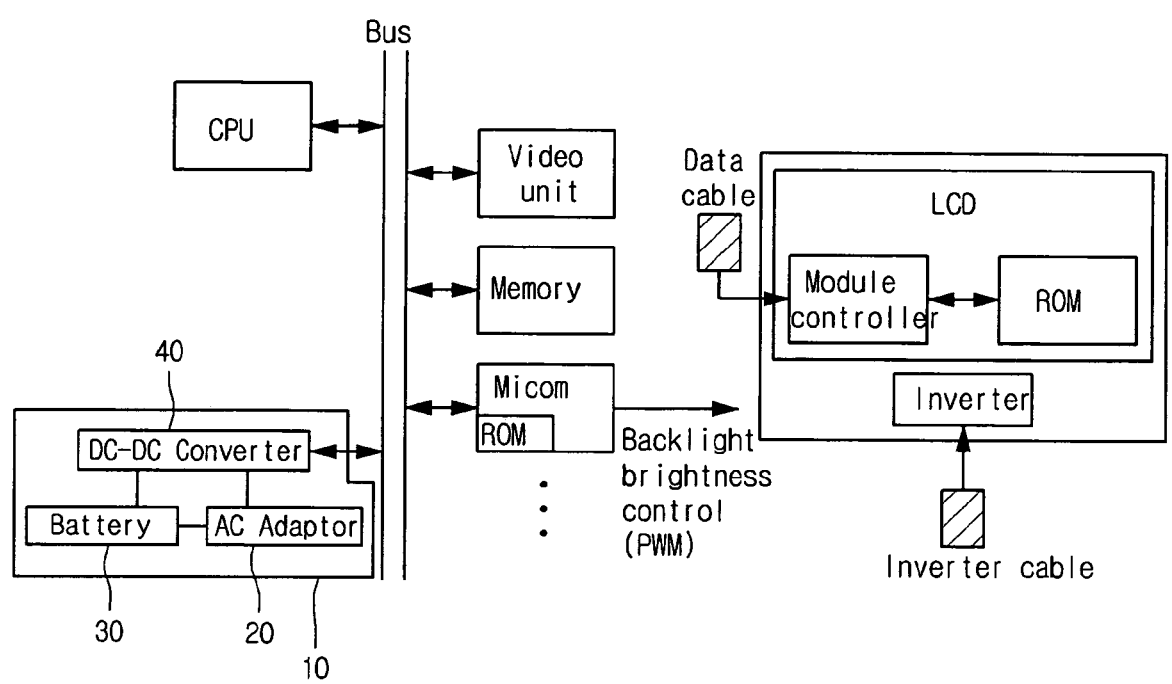
FIG. 1 is a block diagram illustrating a conventional computer system.
Figure 2:
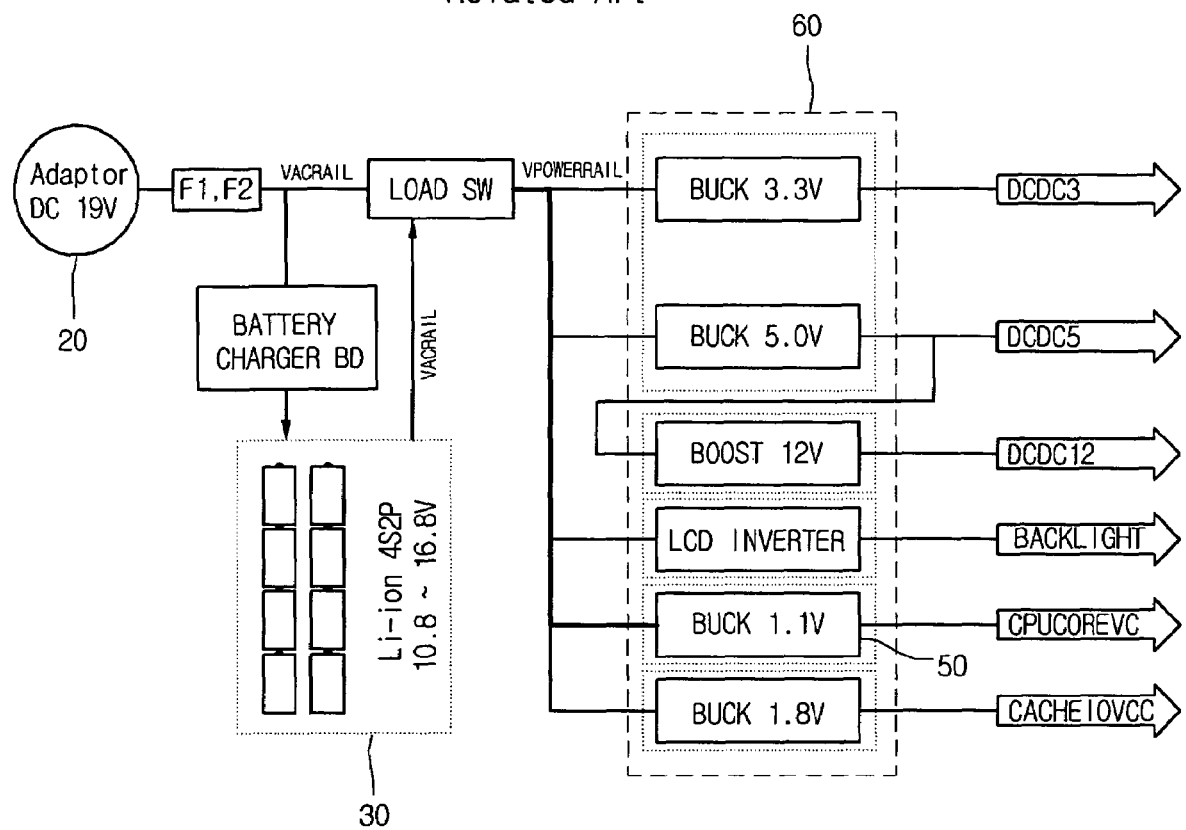
FIG. 2 is a block diagram of a system having a power block that can be adapted according to the present invention and the conventional art.
Figure 15:
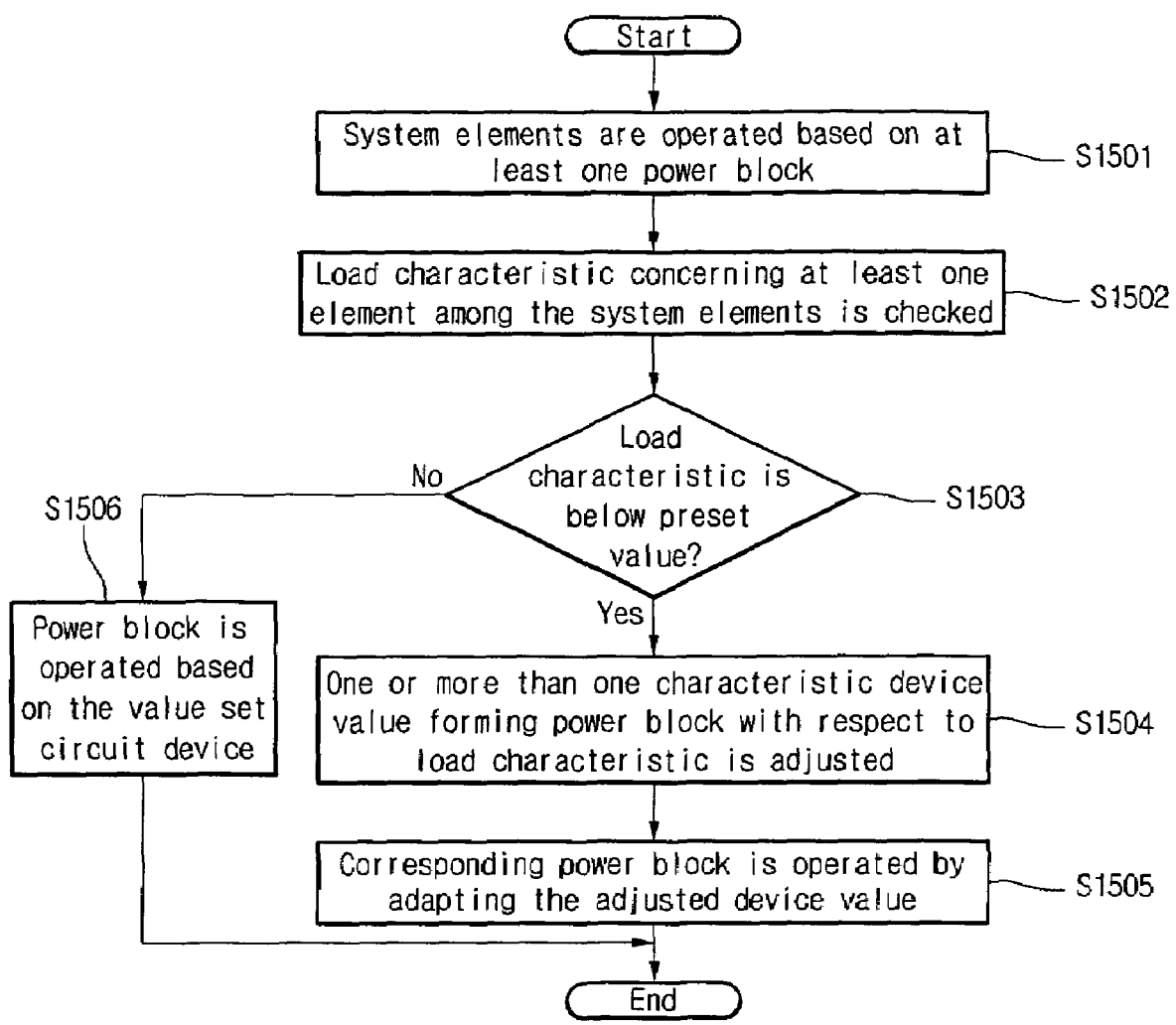
FIG. 15 is a flow chart of an embodiment of a method for enhancing an efficiency of a converter by varying a value of a certain circuit device according to a first embodiment of the present invention.

FIG. 15 is a flow chart of a first embodiment of a method for enhancing an efficiency of a converter by varying a value of a certain circuit device according to the present invention. As shown in FIG. 15, the entire system elements (for example, CPU, etc.) can be operated based on one or more than one power blocks (e.g., power block 60 of FIG. 2) (block S1501).

A load characteristic (e.g., current value) with respect to one or more than one element among the system elements can be checked (block S1502). The load characteristic can be defined or determined to have a plurality of ranges or detectable levels or the like.

The checked load characteristic can be compared to a preset value (block S1503). As a result that whether the load characteristic is below the preset value (for example, 0.2 A) (block S1503), one or more than one circuit device value (for example, inductor) of the power block (e.g., power block 50 of FIG. 2) with respect to the load characteristic (e.g., current value) can be adjusted (block S1504).

The adjusted circuit device value can be adapted to the power block for thereby performing a certain operation (block S1505). Accordingly, performance of the one or more than one elements can be improved.

As a result of the check (block S1503), when the load characteristic is above a preset value (for example, 0.2 A or within a selected range), the power block can be operated using a selected or minimum set circuit device value (block S1506). From blocks S1505 and S1506, the process can end or be repeated.

Figure 16:
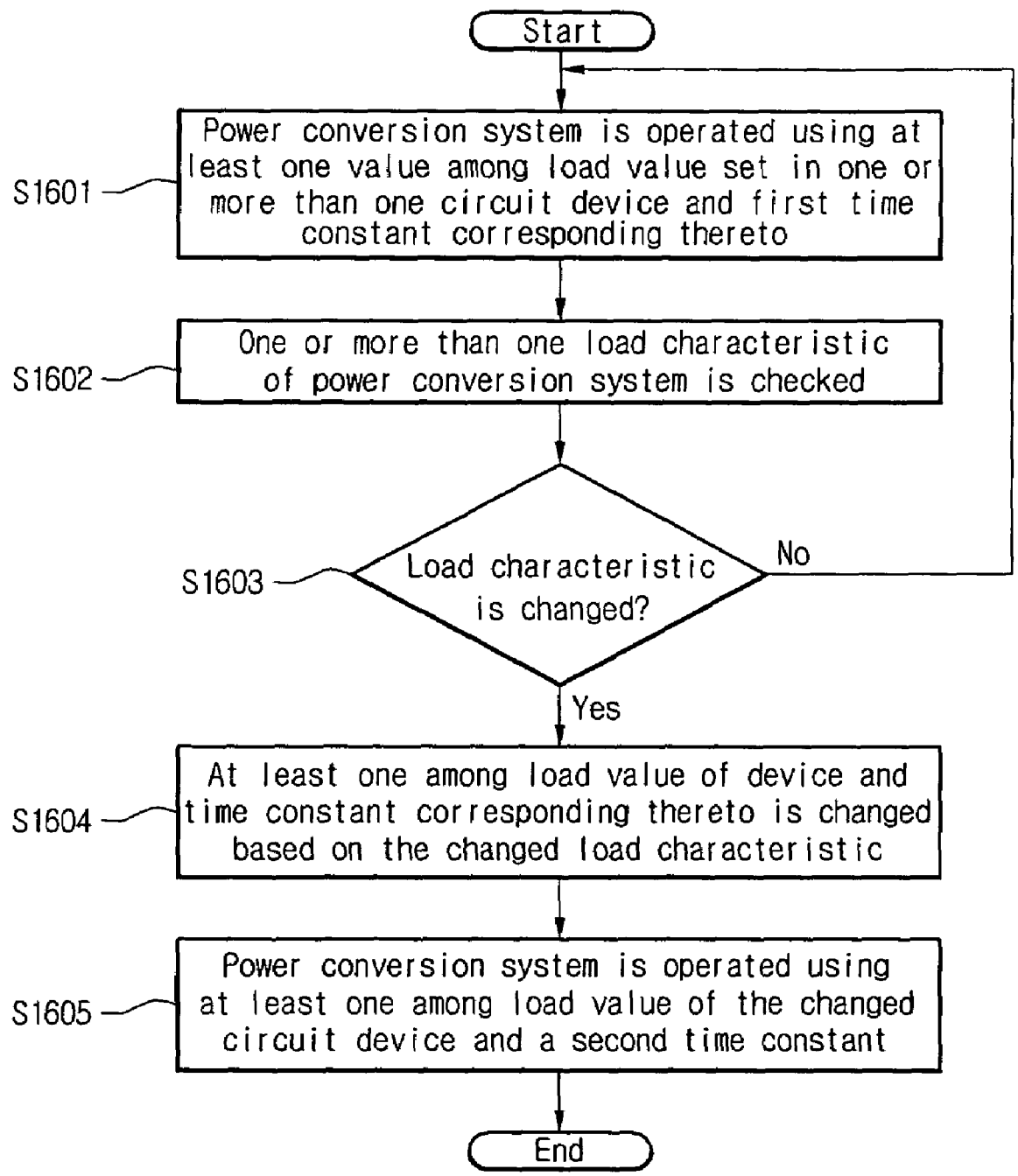
FIG. 16 is a flow chart of another embodiment of a method for enhancing an efficiency of a converter by varying a value of a certain circuit device according to a second embodiment of the present invention.

FIG. 16 is a flow chart of a second embodiment of a method for enhancing an efficiency of a converter by varying a value of a certain circuit device according to the present invention. The method of FIG. 16 can be applied to and will be described using the system and converter of FIGS. 7-8. However, the present invention is not intended to be so limited.

The power conversion system (e.g., converter) can be operated by at least one value among a load value set in one or more than one circuit device and a first time constant corresponding thereto (block S1601).

One or more than one load characteristic (for example, CPU current value) of the power conversion system can be checked (block S1602). As a result of the check, when the load characteristic is determined to be changed, one or more than one circuit device value (for example, inductor value) corresponding to the size of the changed load characteristic or a time constant corresponding thereto can be changed (blocks S1603, S1604). The power conversion system can be operated by at least one value among the changed circuit device value and the second time constant (block S1605).

Figure 17:
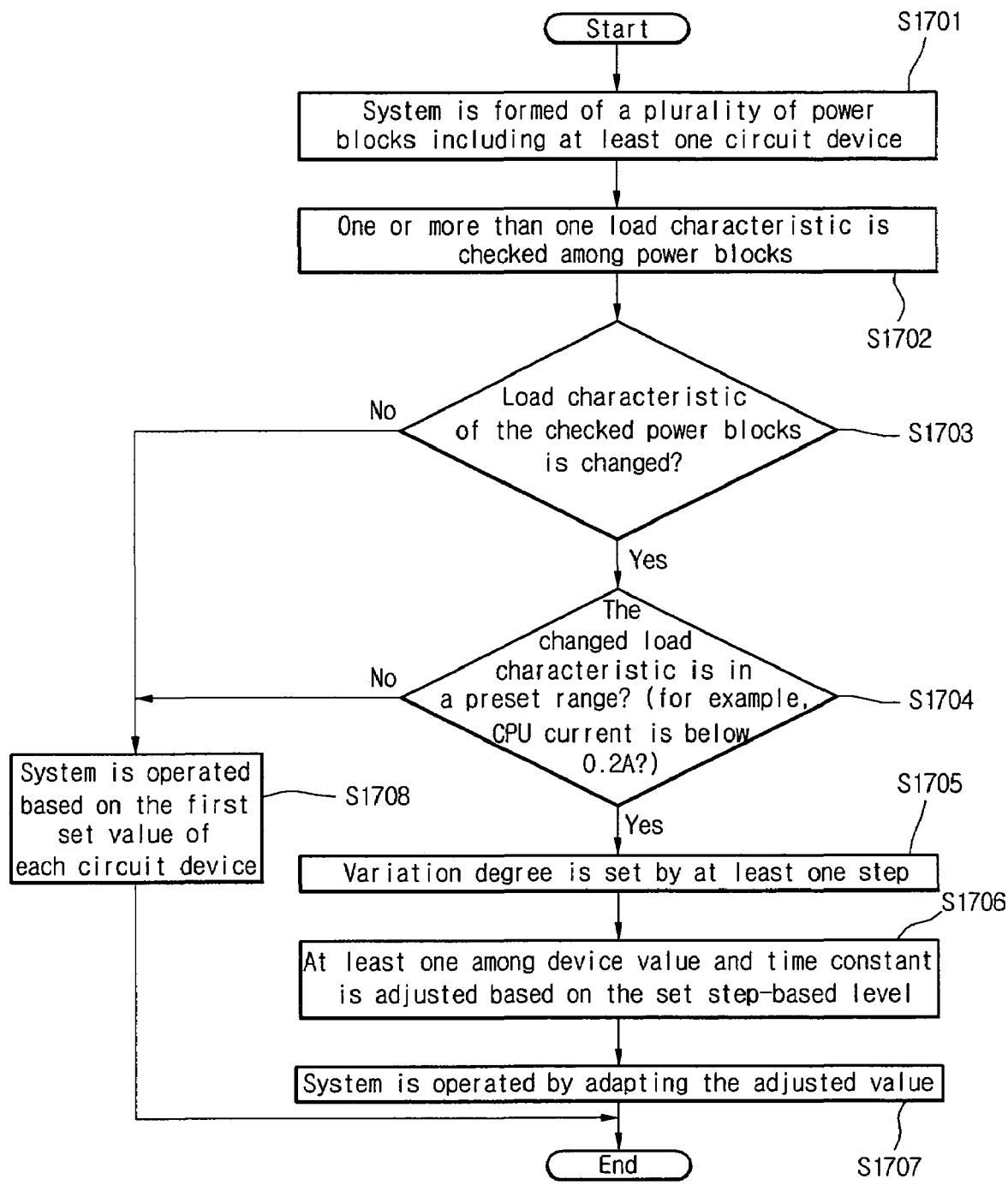
FIG. 17 is a flow chart of yet another embodiment of a method for enhancing an efficiency of a converter by varying a value of a certain circuit device according to a third embodiment of the present invention.

FIG. 17 is a flow chart of a third embodiment of a method for enhancing an efficiency of a converter by varying a value of a certain circuit device according to the present invention. The method of FIG. 17 can be applied to and will be described using the system of FIG. 7. However, the present invention is not intended to be so limited.

As shown in FIG. 17, a system (for example, notebook computer) can be formed of a plurality of power blocks (e.g., power blocks 60 of FIG. 2) including one or more than one circuit device (for example, inductor, capacitor, etc.) (block S1701).

One or more load characteristics (for example, CPU current value) in each of the power blocks can be checked (block S1702). The load characteristic can be a CPU current value, however, the present invention is not intended to be so limited.

When the load characteristic or characteristics of each of the checked power blocks is changed, it is judged whether the changed load characteristic corresponds to the same or a different one of a plurality of preset ranges (for example, below 1.0 A, 0.2 A, etc.) (block S1703).

As a result of the judgment, the variation of the load characteristic of the power block can be set to a corresponding one of the more than 2 step-based levels (block S1705). However, the load characteristic (and corresponding variation) can be determined among more than 1 step-based levels such as more than 3 step-based levels.

A certain device value and/or time constant can be adjusted in response to the selected corresponding or set step-based level (block S1706). Thus, as shown in FIG. 9, one of the taps (e.g., tap 2 or tap 4), or time delays can be selected according to the corresponding range.

The system can then operate based on the adjusted value (block S1707). In the blocks S1703 and S1704, even when the load characteristic is not changed or changed insufficiently to result in movement between ranges, whenever the changed load characteristic does not correspond to a preset variation value, the system is operated based on the first set circuit device value or currently set circuit device value of the load characteristic (block S1708). From blocks S1708 and S1707, the process can end or be repeated (e.g., periodically or upon a prescribed event).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of a power system, DC/DC converter and methods for operating the same have various advantages. In embodiments of an apparatus for converting DC power and a method of the same in which the load characteristic of a certain unit is checked, and a preset circuit device value can be variably adjusted with respect to the checked load characteristic falling within one of a corresponding section of a plurality of sections. Thus, a section of a load having a bad efficiency can be modified or changed to improve an efficiency of the power conversion apparatus.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. In a system that includes a load unit having an inductor device between an input terminal and an output terminal, an apparatus for converting power, comprising:
a load state variation detector configured to detect a load characteristic of the load unit, wherein the load characteristic of the load unit is determined by detecting an output current of the load unit; and an adjusting unit configured to adjust a preset value of the inductor device of the load unit in accordance with the load characteristic detected by the load state variation detector, wherein first time constant is changed corresponding to the changed load characteristic and said adjusting comprises operating the power conversion system using a second time constant.

2. The apparatus of claim 1, wherein the output current of the load unit is an output current of a controller.

3. The apparatus of claim 2, wherein when the output current of the controller that corresponds to the load characteristic of the load unit falls below a threshold value, the preset value is adjusted by the adjusting unit.

4. The apparatus of claim 1, wherein the load characteristic detected by the load state variation detector is classified into one of at least two step-based levels.

5. The apparatus of claim 4, wherein a certain device of a load is differently controlled based on the load characteristic classified into one of a plurality of levels.

6. The apparatus of claim 5, wherein an inductance value of the inductor device is controlled in response to the detected load level of the at least two step-based levels.

7. The apparatus of claim 6, further comprising a switch configured to control the inductance value in response to the detected load level.

8. The apparatus of claim 6, wherein said inductor device comprises a multi-tap inductor in which an inductance value is adjusted by varying a turn ratio of the multi-tap inductor.

9. The apparatus of claim 5, wherein the load operates using a corresponding one of a plurality of different time constraints.

10. A method for operating a power converter, comprising:
coupling at least one system element of a plurality of system elements to at least one power block; checking a load efficiency value with respect to said plurality of system elements, wherein the checked load efficiency value is determined by detecting an output current of the one power block; and
operating at least one circuit device element of said at least one power block in a first mode or a second mode based on the checked load efficiency value, wherein said at least one circuit device element operates in a first mode when the checked load efficiency value is above a first threshold value, and wherein when the output current of the one power block that corresponds to the checked load efficiency value is below a preset value, a preset inductor value is adjusted, wherein first time constant is changed corresponding to the changed load characteristics and said operating comprises operating the power conversion system using a second time constant.

11. The method of claim 10, wherein the load efficiency value is compared to a plurality of additional threshold values and said at least one circuit device element operates in a corresponding one of a plurality of additional modes corresponding to the additional threshold values.

12. The method of claim 10, further comprising operating said at least one circuit device element in the second mode when an efficiency of the first mode is reduced below a prescribed value.

13. The method of claim 10, further comprising operating said at lest one circuit device element in the second mode when the checked load efficiency value is not above the first threshold value.

14. The method of claim 10, wherein the at least one circuit device comprises an inductor.

15. A method, comprising:
operating a system element based on at least one power block;
determining a load characteristic with respect to at least one element in the system element, wherein the load characteristic is determined by detecting an output current of the power block; determining whether the determined load characteristic is below a preset value; and adjusting an inductance of the at least one element of the power block when the output current of the power block that corresponds to the load Characteristic is determined to be below the preset value, the adjusting including adjusting a preset inductor value by an adjusting unit, wherein first time constant is changed corresponding to the changed load characteristic and said adjusting comprises operating the power conversion system using a second time constant.

16. The method of claim 15, further comprising operating the adjusted power block.

17. The method of claim 15, wherein adjusting the inductance includes adjusting an inductor.

18. A method for controlling power, comprising:
operating a power conversion system using at least one value among load values set in at least one circuit device and using a first time constant corresponding thereto;
checking one or more load characteristics of the power conversion system, wherein at least one of the load characteristics of the power conversion system is determined by detecting an output current of the power conversion system;
changing either an inductance value or a time constant in said at least one circuit device based on a changed load characteristic when the load characteristic changes as a result of the checking, wherein when the output current of the power conversion system that corresponds to the at least one of the load characteristics of the power conversion system is below a preset value, the changing includes adjusting a preset inductor value by an adjusting unit; and controlling the power conversion system using said at least one changed value, wherein said time constant is changed corresponding to the changed load characteristic and said controlling comprises operating the power conversion system using a second time constant.

19. The method of claim 18, wherein the inductance value is changed to improve an efficiency of the power conversion system based on the changed load characteristic.

20. A method for controlling power, comprising:
forming a system of a plurality of power blocks that each include one or more circuit devices;
checking one or more load characteristics in a first power block, wherein at least one of the load characteristics of the first power block are determined by detecting an output current of the first power block;
judging whether a changed load characteristic is in a preset value range outside a current value range when the load characteristic of the first power block changes;
adjusting an inductance value of the first power block when the changed load characteristic corresponds to the preset change value range as a result of the judging, wherein when the output current of the first power block that corresponds to the at least one of the load characteristics of the first power block is below a preset value, the adjusting includes adjusting a preset inductor value by an adjusting unit and operating the system using the adjusted inductance value, wherein said time constant is changed corresponding to the changed load characteristic and said operating comprises operating the power conversion system using a second time constant.

21. The method of claim 20, wherein a load characteristic variation level of the first power block can be set to be within one of a plurality of step-based ranges.

22. The method of claim 21, wherein the inductance value is adjusted based on a variation level set within a prescribed range.

23. The method of claim 20, wherein the system operates based on a first set circuit device value when the changed load characteristic does not correspond to the preset change value range.

24. An apparatus for converting power that includes a load unit having an inductor between an input terminal and an output terminal, comprising: an adjusting unit configured to receive a variation level of a load characteristic of the load unit and to adjust a preset inductor to value of the inductor of the load unit to one of at least two levels, wherein the load characteristic of the load unit is determined by detecting an output current of the load unit, and wherein when the output current of the load unit inductor value, wherein first time constant is changed corresponding to the changed load characteristic and said adjusting comprises operating the power conversion system using a second time constant.

25. The apparatus of claim 24, wherein the adjusting unit changes a characteristic value of the inductor.

26. The apparatus of claim 25, wherein the adjusting unit changes an inductance of the inductor.

27. The apparatus of claim 25, wherein the adjusting unit changes a time constant of the inductor.

28. The apparatus of claim 25, wherein the adjusting unit changes a time constant of the inductor without changing an inductance of the inductor.

* * * * *